United States Patent [19]

Brauen et al.

[11] Patent Number: 5,254,033
[45] Date of Patent: Oct. 19, 1993

[54] AUTOMATICALLY RELEASED AIR INLET FILTER

[75] Inventors: Steven M. Brauen, Nospelt, Luxembourg; James L. Cronk, Steyning, England

[73] Assignee: General Motors Corporation, Detroit, Mich.

[21] Appl. No.: 937,769

[22] Filed: Sep. 1, 1992

[51] Int. Cl.⁵ .............................................. B60H 3/06
[52] U.S. Cl. .................................... 454/146; 55/309; 454/158
[58] Field of Search ........................ 55/213, 309, 310; 454/143, 146, 147, 148, 158

[56] References Cited

U.S. PATENT DOCUMENTS

| | | | |
|---|---|---|---|
| 1,914,667 | 6/1933 | Kolla | 55/313 |
| 2,185,486 | 1/1940 | Wahlberg | 165/43 |
| 2,992,701 | 7/1961 | White | 55/309 |
| 4,312,645 | 1/1982 | Mavros et al. | 55/213 |
| 4,597,323 | 7/1986 | Mordau et al. | |
| 4,625,630 | 12/1986 | Carroll et al. | 55/309 X |
| 4,671,810 | 6/1987 | Dietzsch et al. | 55/309 |
| 4,726,823 | 1/1988 | Brice | 55/274 |
| 4,779,517 | 10/1988 | Weller | |

FOREIGN PATENT DOCUMENTS

| | | | |
|---|---|---|---|
| 337071 | 10/1989 | European Pat. Off. | 454/158 |
| 433056 | 8/1926 | Fed. Rep. of Germany | 55/313 |
| 160723 | 6/1989 | Japan | 454/158 |

Primary Examiner—Harold Joyce
Attorney, Agent, or Firm—Patrick M. Griffin

[57] ABSTRACT

In an automotive heating and/or cooling system, an air inlet leads to plenum which contains a filter held horizontally by a hinge at one side and by a spring latch at the other side to filter the incoming air flow. The spring latch has a limited holding force so that if the filter becomes clogged the force of the air flow through the filter is sufficient to overcome the spring latch and the filter will swing open to a bypass position. The incoming air will then enter the system without filtering.

7 Claims, 1 Drawing Sheet

AUTOMATICALLY RELEASED AIR INLET FILTER

FIELD OF THE INVENTION

This invention relates to a filter for an automotive air conditioning and/or heating system and particularly to such a filter which automatically moves out of the air stream when it becomes clogged.

BACKGROUND OF THE INVENTION

Heater, ventilation and air conditioning (HVAC) systems for automotive systems require fresh outside air to be drawn into the systems and incorporate blowers for air induction and distribution into the vehicle passenger compartment. The outside air sometimes includes dirt such as pollen, dust, debris or other contaminants which desirably is excluded from the passenger compartment. Accordingly a filter is interposed in the air stream at or just downstream of the intake opening, which is usually located in a space between the rear of the vehicle hood and the front edge of the windshield.

Air inlet filters gradually become clogged with dirt over an extended period of operation and thus should be replaced periodically with a clean filter element; failure to properly maintain the filter will eventually lead to a clogged condition. Where high humidity dampens the filter, dusty air can quickly clog the filter. In any event, when clogging occurs the system efficiency falls and normal air flow must be restored. For that purpose automatic filter retraction arrangements have been proposed.

Previous automatic filter retraction systems have used a filter which is movable from the air stream and is biased for such movement, a latch for holding the filter in operative position, and a sensor for determining when the filter is clogged and effective to release the latch, so that the filter will be moved to a position out of the air stream to allow unfiltered air to flow through the system. The system blower creates a suction on a filter which increases as dirt accumulates, so that the pressure differential across the filter can be used as an indicator of the filter condition. Prior systems have used diaphragms or other differential pressure sensors connected across the filter to release the latch While such sensors are effective, they are also expensive; it is thus desirable to accomplish the filter release without a separate sensor.

SUMMARY OF THE INVENTION

It is therefore an object of the invention to provide an air inlet filter arrangement which will release a clogged filter for movement out of the air stream and does not require a separate differential pressure sensor.

The invention is carried out by a filtered air inlet for an automotive ventilation system subject to an accumulation of dirt comprising: an air induction opening on a vehicle; a passage inside the induction opening; a filter in the passage for filtering air flowing from the inlet to the passage, whereby gradual dirt accumulation on the filter in combination with air flow causes an increasing force on the filter; means for mounting the filter in the passage for movement between a first operative filtering position and a second position for bypassing the air flow; and latch means responsive to the force on the filter for holding the filter in the first position when the force on the filter is below a threshold and for releasing the filter for movement to the second position when the force reaches the threshold.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
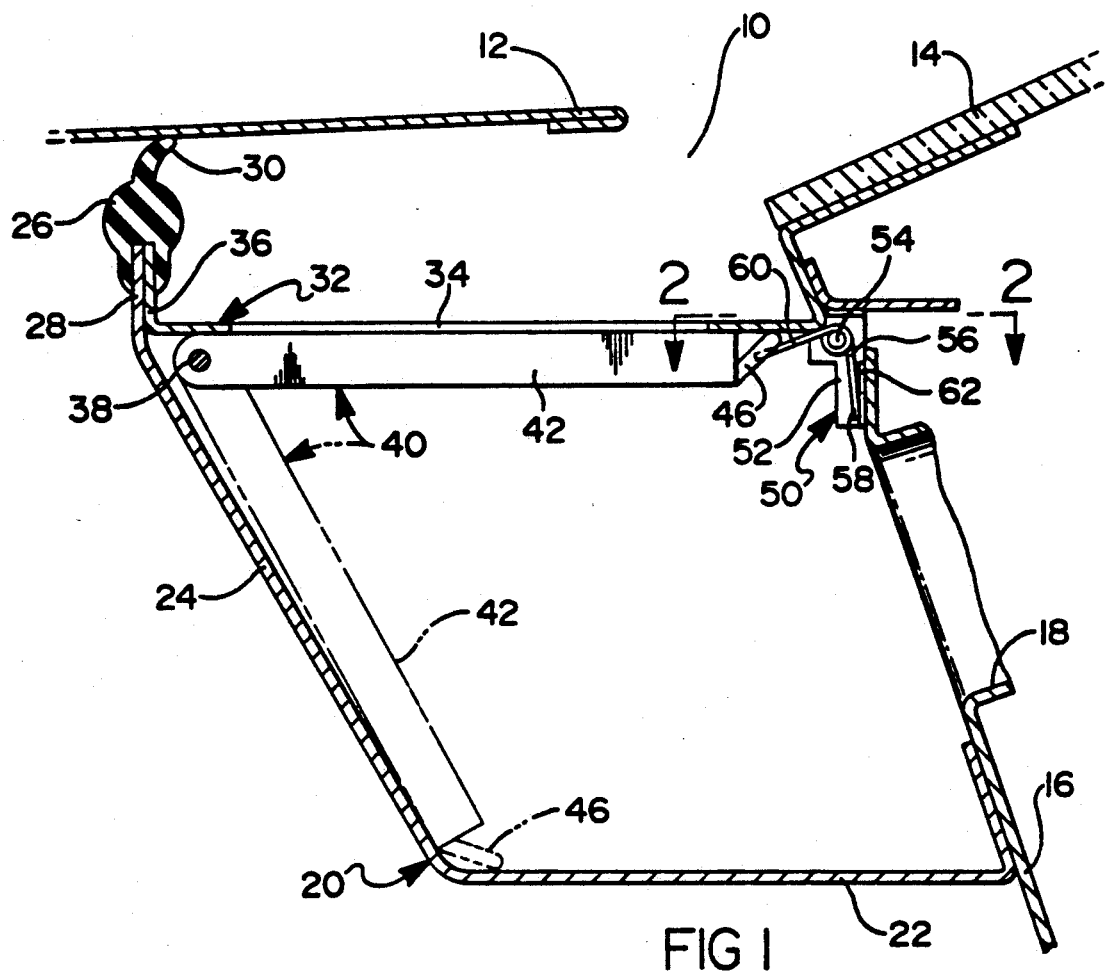
FIG. 1 is a cross-sectional elevation through an intake passage of an automotive HVAC system according to the invention.
Figure 2:
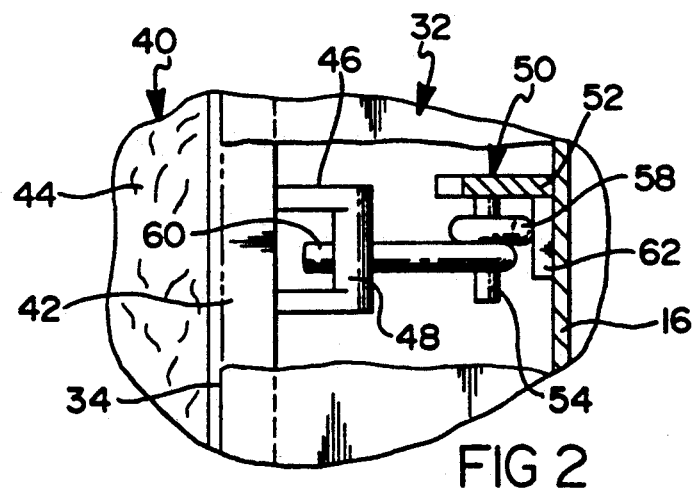
FIG. 2 is a cross section taken along lines 2—2 of FIG. 1 illustrating the latch according to the invention.

Referring to the drawings, an air inlet or induction opening 10 for an automotive HVAC system is formed by a space between the rear edge of the vehicle hood 12 and the front edge of the windshield 14. The vehicle dash 16 extends downward from the edge of the windshield and contains an opening 18 leading to the intake of the HVAC blower (not shown) A plenum 20 is formed on the front of the dash 16 and comprises a bottom 22, a front wall 24 and a seal 26 extending up toward the hood 12, as well as the part of the dash 16 above the bottom 22. A flange 28 at the top of the front wall 24 is inserted in a groove of the seal 26 to hold the seal, and a lip 30 at the top of the seal engages the under side of the hood when it is closed. Thus the plenum volume is defined by the hood 12, the dash 16, the bottom 22 and the front wall 24.

A frame 32 having a central opening 34 is mounted horizontally in the upper portion of the plenum 20 near the hood 12 and inlet 10 The forward part of the frame 32 has an upwardly turned flange 36 contiguous with the flange 28 and secured thereto and the opposite side of the frame is attached to the dash 16 just below the windshield 14. A pivot pin 38 is supported beneath the forward part of the frame 32. A filter 40 comprising a filter frame 42 carrying filter media 44 is mounted horizontally beneath the frame 32 covering the opening 34. The front part of the filter frame 42 is pivotally mounted on the pivot pin 38 and the rear part of the filter frame 42 has a rearwardly extending bracket 46 holding a horizontal rod 48 which is normally engaged by a latch mechanism 50 mounted on the dash 16 just below the frame 32.

The latch mechanism 50 includes a bracket 52 mounted to the dash and having an outstanding pin 54. A coil spring 56 is wrapped around the pin 54 and has two wire ends 58 and 60. The end 58 is stationary and is biased against a flange 62 on the bracket. The other end 60 extends forward and is biased upward against the underside of the rod 48 on the rear of the filter frame 42. The spring force applied by the wire end 60 to the frame 42 is sufficient to hold the filter frame 42 up against the frame 32 under normal conditions. The spring force is limited to a certain threshold value to release the filter frame 42 when the force on the frame exceeds a particular amount. When the latch releases, the filter frame is released and it swings down about the pivot pin 38 to a position against the forward wall 24.

In operation, the blower pulls air in through the inlet 10, through the filter media 44, and through the plenum 20 to the opening 18 to supply the HVAC system. Dust or other dirt in the air is trapped in the filter. Generally, the force on the filter due to air flow through the filter media 44 is small. As the filter accumulates dirt the force on the filter increases and when a prescribed force indicative of a clogged filter is attained, the force overcomes the spring force of the latch 50 and the filter pivots from its operative filtering position to a bypass position out of the air stream. Then the air flows directly from the inlet, through the plenum to the opening 18, bypassing the filter.

The filter 40 can be accessed for maintenance by opening the hood 12 thereby exposing the top of the plenum. Ideally filter media replacement or cleaning will occur sufficiently often that the filter does not become clogged and the spring latch does not have to release. However, in case of a sudden loading of the filter or of an extended service interval, the filter can become clogged and consequently then released to its bypass position Then to restore the filter function the media must be changed and the filter reset to its normal operative filtering position.

It will thus be seen that by this invention the bypass or release function of a filter is carried out by an extremely simple mechanism; no diaphragm or other pressure differential sensor is required to operate a release mechanism The embodiments of the invention in which an exclusive property or privilege is claimed are defined as follows:

1. A filtered air inlet for an automotive ventilation system subject to an accumulation of dirt comprising:
    an air induction opening on a vehicle;
    a passage inside the induction opening;
    a filter in the passage for filtering air flowing from the inlet to the passage, whereby gradual dirt accumulation on the filter in combination with air flow causes an increasing force on the filter;
    means for mounting the filter in the passage for movement between a first operative filtering position and a second position for bypassing the air flow; and
    latch means responsive to the force on the filter for holding the filter in the first position when the force on the filter is below a threshold and for releasing the filter for movement to the second position when the force reaches the threshold.

2. The invention as defined in claim 1 wherein the means for mounting the filter comprises means for pivotally mounting the filter at one side of the passage for movement between a first position for filtering the air and a second position for bypassing the air.

3. The invention as defined in claim 1 wherein the latch means comprises a spring catch biased against the filter with sufficient resistance to withstand a force on the filter below the threshold and which is overcome by a force above the threshold to release the filter.

4. The invention as defined in claim 2 wherein the filter has an edge opposite the pivotally mounting means; and
    the latch means comprises a spring catch biased against the filter edge with sufficient resistance to withstand a force on the filter below the threshold and to release the filter at a higher force.

5. The invention as defined in claim 1 wherein the latch means comprises a bracket holding a coil spring with two outwardly extending end wires, one end wire being biased against a side of the bracket and the other end wire being biased against the filter with sufficient force to withstand force on the filter up to the threshold force.

6. In an automotive air conditioning or heating system, an intake filter means at the system entrance comprising;
    a plenum at the entrance of the system for receiving a flow of inlet air;
    filter means including a frame and filter media supported by the frame;
    a pivot mount at one side of the plenum and a latch at the opposite side of the plenum for jointly holding the frame to interpose the filter media in the flow of inlet air, wherein the filter is subject to force as a function of dirt loading; and
    the latch comprising a resilient member for holding the frame up to a limit force value and releasing the frame at higher force values for pivotal movement out of air flow.

7. The invention as defined in claim 6 wherein the resilient member comprises a coil spring coiled around a support on the opposite side of the plenum with two outwardly extending end wires, one end wire being held stationary and the other end wire being biased against the frame for holding the frame.

* * * * *